United States Patent [19]

Stokely

[11] 4,314,347
[45] Feb. 2, 1982

[54] SEISMIC SIGNAL PROCESSING MACHINE AND METHOD FOR NOISE REMOVAL

[75] Inventor: John E. Stokely, Houston, Tex.

[73] Assignee: Texaco Inc., White Plains, N.Y.

[21] Appl. No.: 813,149

[22] Filed: Jul. 5, 1977

Related U.S. Application Data

[63] Continuation of Ser. No. 325,489, Jan. 22, 1973, abandoned.

[51] Int. Cl.³ .............................................. G01V 1/28
[52] U.S. Cl. .................................. 364/574; 364/421; 367/47
[58] Field of Search .................... 364/574, 421; 324/1; 340/15.5

[56] References Cited

U.S. PATENT DOCUMENTS

| | | | |
|---|---|---|---|
| 3,275,980 | 9/1966 | Foster | 340/15.5 |
| 3,550,074 | 12/1970 | Kerns et al. | 340/15.5 |
| 3,590,228 | 6/1971 | Burke | 235/151.35 |
| 3,622,966 | 11/1971 | George, Jr. et al. | 340/15.5 |
| 3,633,009 | 1/1972 | Green et al. | 235/151.3 |

Primary Examiner—Edward J. Wise
Attorney, Agent, or Firm—Carl G. Ries; Jack H. Park

[57] ABSTRACT

A machine and method processing seismic survey signals to reduce the effect of noise bursts by determining the power level of the signals recorded during a seismic survey and removing those portions of the signal which deviate from the remainder of the signals by unacceptable amounts.

5 Claims, 6 Drawing Figures

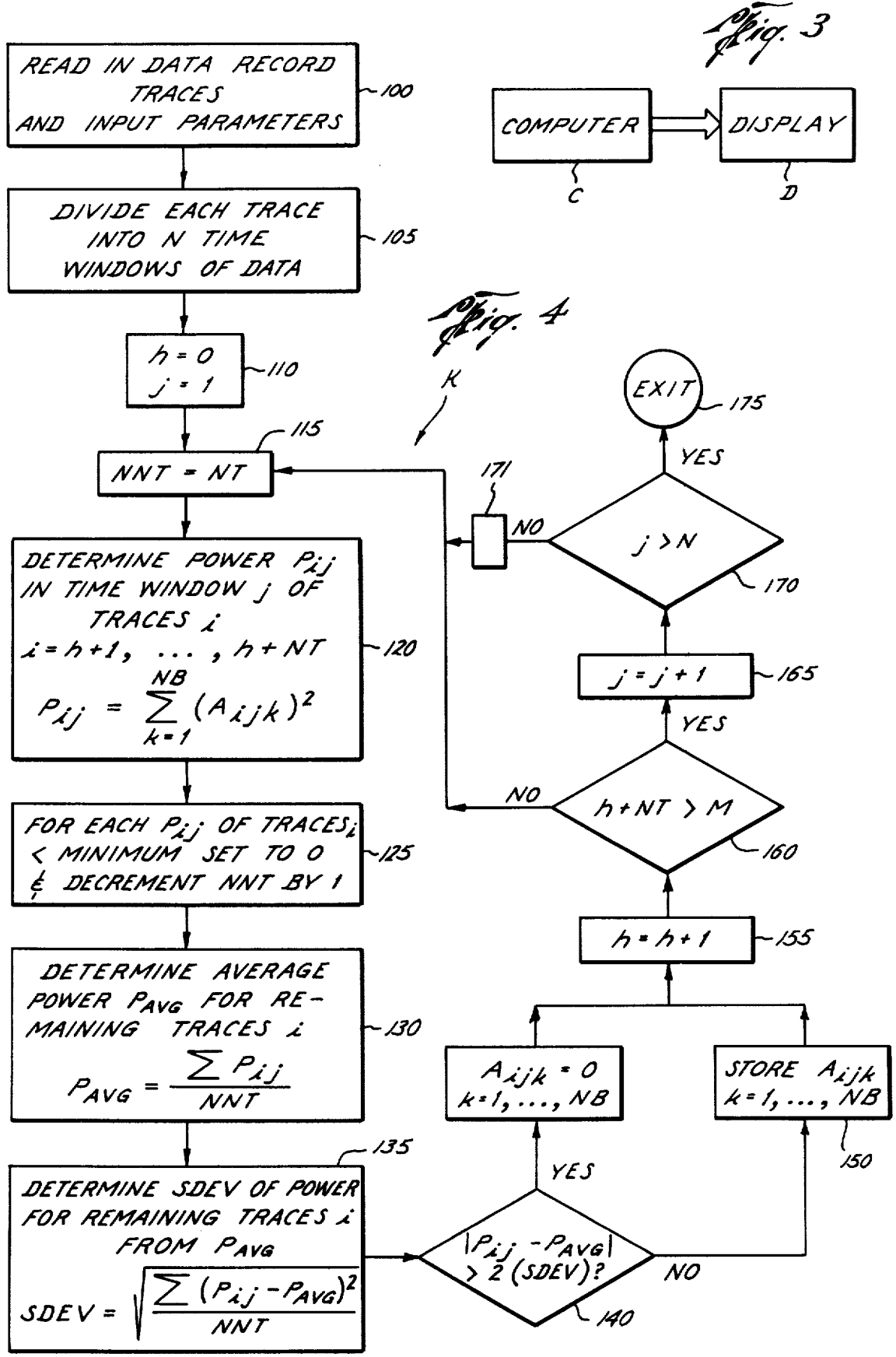

SEISMIC SIGNAL PROCESSING MACHINE AND METHOD FOR NOISE REMOVAL

This is a continuation of application Ser. No. 325,489, filed Jan. 22, 1973.

BACKGROUND OF THE INVENTION

1. Field Of The Invention

The present invention relates to processing of seismic signals in data processing machines.

2. Description of Prior Art

In seismic exploration surveys, bursts of high amplitude undesirable signals, known in the art as noise, often occurred in the signal records or traces, due to lightning, static discharge and numerous other causes.

So far as is known, prior art seismic signal processing has attempted to identify noise in the traces by setting an upper amplitude limit or boundary and treating signals exceeding this limit as noise. This process has several shortcomings, particularly for signal records from exploration with a swept frequency vibratory seismic signal source, where the amplitude of "near traces", signals sensed at recording instruments near the source, was larger than that of "far traces", signals sensed at recording instruments further from the source.

SUMMARY OF THE INVENTION

Briefly, the present invention provides a new and improved process and method of controlling the operation of a data processing machine, such as a general purpose digital computer, to process seismic signals and achieve the desired result of seismic signals having the effect of noise bursts therein reduced. When the machine is operating under control of the process, it is a new and improved machine, processing seismic signals to reduce the effect of noise bursts on such signals.

In the present invention, the power level of a specified plurality of the seismic signals during a common time window or time interval is determined, and the average of these power levels is determined. The power level during the common time interval of each of the specified plurality of seismic signals is compared with the average power level and any signal whose power level deviates from the average power by an unacceptable amount during this time interval, and accordingly is in all likelihood a noise burst during the time interval, is then removed for the duration of the time interval to reduce the effect of noise bursts on the signals. After each of the specified plurality of signals has been processed, one is replaced by a signal as yet unprocessed, forming a newly specified plurality of traces which are processed for the common time window. When all signals have been processed for one time window, a new time window is chosen for processing.

The present invention further determines an acceptable amount of deviation from the average power by determining the standard deviation of the power level of the seismic signals from the average power, and the standard deviation is then increased by a specified factor, for example two. The power level of the seismic signals being processed is then compared with this acceptable amount of deviation, and those whose power levels differ from the mean power level by more than this amount are deleted from the signal for the duration of the time interval.

It is an object of the present invention to provide a new and improved method and machine for reducing the effect of noise and noise bursts on seismic signals.

BRIEF DESCRIPTION OF DRAWINGS

FIG. 3 is a schematic diagram of the machine of the present invention; and

FIG. 4 is a schematic diagram of the preferred sequence of steps for controlling the operation of the machine of FIG. 3 in accordance with the present invention.

DESCRIPTION OF PREFERRED EMBODIMENT

In seismic surveying, such as that known in the art by the trademark "VIBROSEIS", a varied or swept frequency vibratory seismic signal is sent into the earth and the response of the earth monitored at plural spaced geophones or seismic signal recording means in order to form seismic return data.

During these surveys, undesirable signals or noise in the form of spikes or high amplitude pulses or bursts often occur, due to several causes, greatly hampering signal processing.

The return data are typically processed by being cross-correlated with the input signal. When noise spikes are present in the return data, cross-correlation with the input signal causes an inverted version of the input signal to appear in the return data, greatly reducing the intelligibility of the seismic signal for geophysical analysis and interpretation.

Figure 1A:
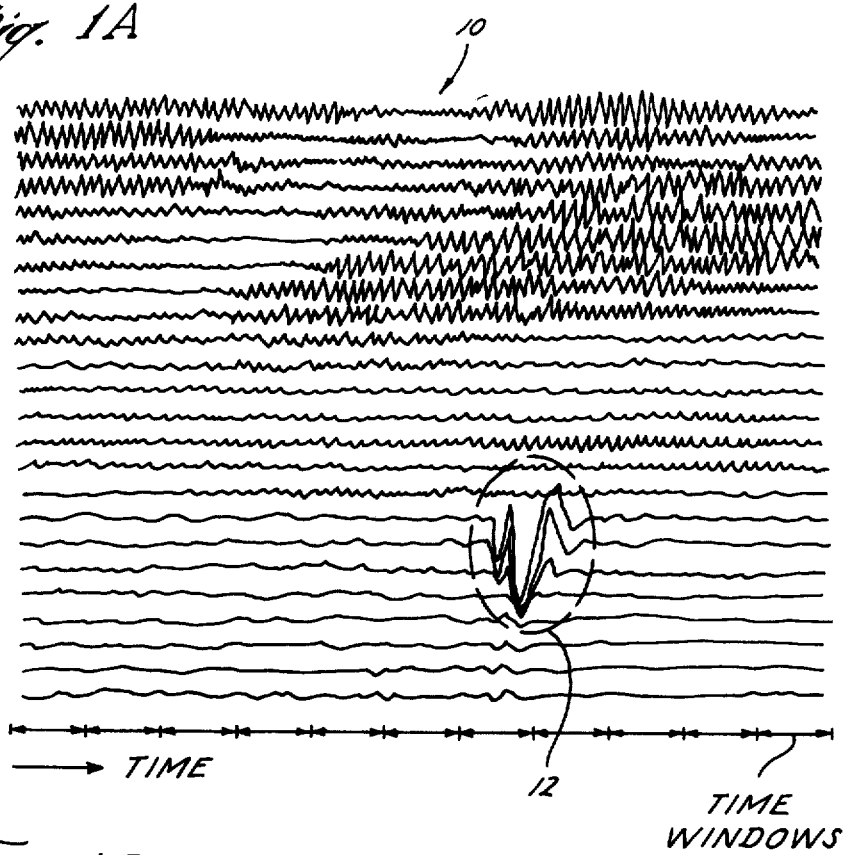
FIGS. 1A and 1B are seismic record displays of seismic return data, as a function of time, before and after, respectively, processing in accordance with the present invention.
Figure 2A:
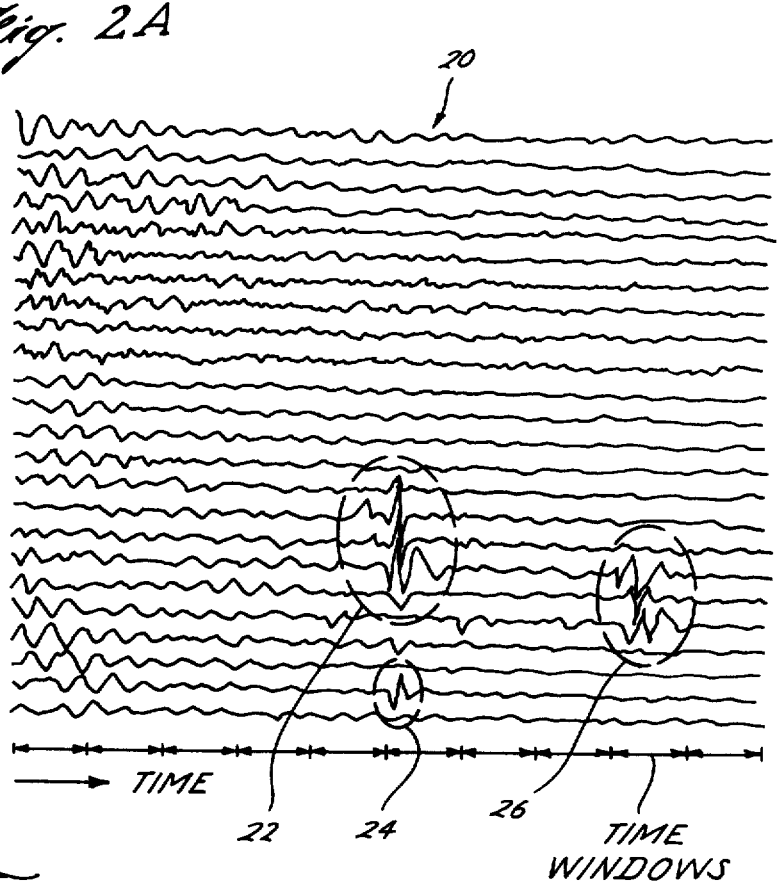
FIGS. 2A and 2B are further seismic record displays of seismic return data, as a function of time, before and after, respectively, processing in accordance with the present invention.

In the drawings at 10 (FIG. 1A), a plurality of seismic traces are set forth indicating response of seismic signal recording means over a time interval of several seconds to an input swept frequency seismic signal sent into the earth from a vibratory seismic signal source. In the return data of traces 10, a high amplitude noise spike or burst appears at 12. A second plurality of seismic traces 20 (FIG. 2A) includes a plurality of noise spikes, such as a noise burst 22, a noise burst 24 and a noise burst 26.

As has been set forth, these noise spikes, when cross-correlated with the input signal during processing cause an inverted version of the input signal to appear in the return data, hampering interpretation and analysis of the return data.

With the present invention, it has been found that the power levels of noise spikes in seismic return data deviate abnormally from those present in normal seismic traces. Accordingly, a data processing machine C (FIG. 3), such as a general purpose digital computer, is controlled in a desired sequence of steps, to be set forth below, to remove noise bursts from a specified number M, which is some integer, of seismic signals to increase their intelligibility, clarity and utility in geophysical analysis.

Each of the seismic signals is initially divided into a plurality of time intervals or time windows, as indicated in the drawings, for subsequent processing. A power level $P_{ij}$ is determined for each trace i of a specified plurality NT (NT being an integer preferably less than M, of seismic traces during a common time window j)

by squaring the amplitude samples in each trace i over the common time window j.

Each power level $P_{ij}$ so determined is then compared with a specified minimum power level, and those which do not exceed this minimum are then set to zero, in order to prevent low amplitude level signals of little interest from unduly affecting analysis, such as by causing removal of desirable seismic signals of intermediate amplitude due to their prominence in comparison with these low amplitude level signals.

An average, or arithmetic mean, power level $P_{AVG}$ of the remainder of the specified plurality of traces, those exceeding the specified minimum power level, is then determined by summing their individual power levels and dividing by the number of traces in such remainder.

The power level $P_{ij}$ of each of the remainder of the specified plurality of traces is then compared with the average power level $P_{AVG}$ so determined, and those signals whose power levels exceed the average power level $P_{AVG}$ for the time window by more than an acceptable amount of deviation are removed. A suitable technique of removing these signals with excessive power levels is by deleting, or setting to zero amplitude, the signals so deviating over the time window j, although these signals may be set to a predetermined minimum amplitude, if desired.

Further, in accordance with the present invention, it has been found that a seismic signal whose power level $P_{ij}$ exceeds the average power level $P_{AVG}$ in a time window j by more than a multiple factor of the statistical standard deviation SDEV is in all likelihood a noise burst and can accordingly be removed without significantly impairing data intelligibility or integrity. Thus, the standard deviation, SDEV, of each trace in the remainder of the specified plurality of traces is determined in the conventional computer-implemented manner: by squaring the difference in power level $P_{ij}$ between each of these traces and the average power level $P_{AVG}$, determined in the manner set forth above, summing these squared products dividing by the number of traces in the group, and taking the square root thereof.

In the preferred embodiment, the standard deviation SDEV is doubled, or increased by a factor of two, and the double standard deviation SDEV is used as the acceptable amount of deviation in power levels for determining whether the portion of the seismic trace in the time window being processed contains a noise burst, or represents valid seismic data.

As has been set forth, these signals whose power levels $P_{ij}$ exceed the average power $P_{AVG}$ by more than the acceptable amount of deviation are removed. Those signals whose power levels differ from the average power by less than the acceptable amount of deviation are stored for display on a computer display D (FIG. 3) or for further processing by other seismic signal processing methods in the computer C, such as cross-correlation or desweeping by the input swept frequency signal.

After comparison of the power level $P_{ij}$ of each of the remainder of the specified plurality of seismic signals in the common time window j has been performed and signal segments having powers which deviate from the average power $P_{AVG}$ by an unacceptable amount are removed, a seismic signal from the seismic signals as yet unprocessed is substituted for one of the specified plurality NT of seismic signals in order to form a newly specific plurality NT of seismic signals. The steps of determining the power level $P_{ij}$, determining the average power $P_{AVG}$, and removing signal segments whose powers deviate from the average power $P_{AVG}$ in the time window j by more than an acceptable amount are then repeated for the newly specified plurality NT of seismic signals for the common time window j. The above procedure is repeated until each seismic signal has been processed in the manner set forth above for the common time window j as one of a newly specified plurality of seismic traces.

At this time, a new common time window j in the seismic signals is selected and the determination of power levels $P_{ij}$ of each of the seismic signals in the new common time window j begins and the procedure set forth above is repeated, deleting those signals whose power level during the new common time window j exceeds the acceptable amount of deviation in order to remove the effect of noise bursts.

The above process is performed iteratively in the data processing machine C, in a manner to be set forth below, until the power levels have been determined in each of the M data record traces of input data for each of the common time windows j into which the trace records are divided.

In the drawings, a flow chart K (FIG. 4) sets forth the desired sequence of steps controlling the operation of the digital computer C, such as a Control Data Corporation Model 3500, to achieve the desired result of seismic signals having the noise bursts therein significantly reduced, in order to provide seismic signals of greater intelligibility and clarity for geophysical analysis and interpretation. The flow chart K sets forth the process steps of the present invention in sufficient detail to enable a computer programmer of ordinary skill in the seismic signal processing art to program a general purpose computer, such as the computer C, using a conventional programming language, such as FORTRAN, in accordance with the present invention.

An instruction 100 causes the computer C to read in the data record traces to be processed and the requisite input parameters to control the computer C. The input parameters include the following parameters: N—defining the number of time windows into which the data record traces are to be divided; M—the number of traces in the field data; L—the length of the time windows into which the traces are to be divided; NB—the number of digital amplitude samples within a time window, equalling the input parameter L divided by the sample interval at which the digital amplitude samples are taken in the seismic return data; and NT, an integer preferably less than M, such as 15, although it can equal M, if desired, and defining the specified plurality of seismic traces whose power levels are to be determined, averaged and compared in a manner to be set forth below during one iteration.

Control is then transferred to an instruction 105 which causes the computer C to divide each trace in the M traces in the data record into N time windows of data.

An instruction 110 then assumes control of the computer C and causes the computer C to initialize two counter locations in the computer C, namely a counter h and a counter j. The instruction 110 causes the computer C to initialize the counter h to 0 and the counter j to 1.

An instruction 115 then assumes control of the computer C and causes the computer C to read into a storage location NNT the input parameter NT, defining the specified plurality of input traces to be processed during one iteration.

An instruction 120 then assumes control of the computer C and causes the computer C to determine the power $P_{ij}$ in a time window j of each of i traces, where i is each of a plurality of integers equalling the contents of the process counter h incremented by each integer from one through the input parameter NT. In determining the power $P_{ij}$ in the time window j of each of the i traces, the computer C sums the squared value of each of NB amplitude samples $A_{ijk}$ for each of the NB amplitude samples in the time window j, where k is each integer from one to NB.

An instruction 125 then assumes control of the computer C and each seismic signal in the time window j whose power level $P_{ij}$, determined in step 120 for the traces i, is less than a specified minimum power level value, determined based on an acceptable minimum power level for desired primaries, in the return data, is set to 0. Further, the contents of the storage location NNT are decremented by 1 for each signal whose power level $P_{ij}$ is set to 0. It should be understood that the specified minimum power level may be an input parameter selected according to the particular return data to be processed, if desired, and read into the computer C by step 100.

Removing those seismic traces whose power level $P_{ij}$ during the time window j is less than the specified minimum removes low amplitude data of little interest and thereby prevents intermediate amplitude valid seismic data from being sensed as noise during processing.

An instruction 130 then assumes control of the computer C and causes the computer C to determine the arithmetic mean or average power $P_{AVG}$ for the remaining traces i, whose number is stored in location NNT, not set to 0 by the process step 125. The average power $P_{AVG}$ is the sum of the power levels $P_{ij}$ of the NNT remaining traces i divided by the number of remaining traces i stored as the contents of the storage location NNT.

Control of the computer C is then transferred to an instruction 135 which causes the computer C to determine the standard deviation SDEV of the power levels of the NNT remaining traces i from the average power $P_{AVG}$. The standard deviation is determined in the computer C by squaring the difference between the power level $P_{ij}$ of each of the remaining traces i and the average power level $P_{AVG}$, summing these squared products, dividing by the number NNT of remaining traces i, and taking the square root of the summed squared products.

A decision instruction 140 then assumes control of the computer C and compares the power level $P_{ij}$ of each of the NNT seismic signals with the average power $P_{AVG}$ by determining the absolute difference therebetween. For each difference so determined, the decision instruction 140 causes the computer C to compare such difference with twice the standard deviation SDEV. For each difference so determined exceeding twice the standard deviation SDEV, the decision instruction 140 transfers control of the computer C to an instruction 145. For those differences between the power levels $P_{ij}$ and the average power $P_{AVG}$ not exceeding twice the standard deviation SDEV, the decision instruction 140 transfers control of the computer C to an instruction 150.

The instruction 145 causes the computer C to remove each of k amplitude samples $A_{ijk}$ in the portion of the seismic trace in time window j where the power level $P_{ij}$ deviates from the average power level $P_{AVG}$ by more than twice the standard deviation by setting such amplitude samples to zero.

The instruction 150 causes the computer C to store amplitude samples $A_{ijk}$ for each of the NB amplitude samples in those time windows j of traces i whose power level $P_{ij}$ deviates from the average power $P_{AVG}$ by less than twice the standard deviation SDEV, and accordingly generally contain valid seismic signals.

Each of the instructions 145 and 150 transfers control of the computer C to an instruction 155 which increments the contents of the counter h by 1 and transfers control of the computer C to a decision instruction 160.

The decision instruction 160 compares the sum of the contents of the counter h and the input parameter NT with the input parameter M to determine whether each of the M input data record traces have been processed by the computer C to remove amplitude samples therein whose power level deviates from the average power $P_{AVG}$ by an unacceptable amount.

When the sum of the contents of the counter h and the input parameter NT is less than or equal to the input parameter M, at least one of the M input data record traces remains to be processed for time window j, and accordingly the decision instruction 160 transfers control of the computer C to the instruction 115 which reads into the storage location NNT the input parameter NT, resetting the contents of such storage location, and transfers control of the computer C to the instruction 120, in the manner set forth above. Performance of the instruction 155 prior to the decision instruction 160 accordingly substitutes a time window portion j from one of the M signals as yet unprocessed for one of the specified plurality NT of seismic signals, which are then processed by repeating steps 120 and following, in the manner set forth above.

When the sum of the contents of counter h and the input parameter NT exceed the input parameter M, each of the M seismic signals has been processed by the computer C under control of the instruction of 120 and following during its time window j, and the decision instruction 160 accordingly transfers control of the computer C to an instruction 165.

The instruction 165 increments the contents of the counter j by one and transfers control of the computer C to a decision instruction 170.

Decision instruction 170 compares the contents of the counter j with the input parameter N in order to determine whether each of the N time window portions of the M data record traces have been processed by the computer C in accordance with instructions 120 and following. When the contents of the counter j are less than or equal to the input parameter N, at least one time window portion j of the N time window portions in the M data record traces remains to be processed in accordance with the instructions 120 and following, and the decision instruction 170 accordingly transfers control of the computer C via an instruction 171 which sets the contents of counter h to 0 and transfers control to the instruction 115 for such processing to begin for the time window identified by the incremented counter j.

When the decision instruction 170 determines that the contents of the counter j exceed the input parameter N, each of the N time window portions in the M input data record traces has been processed by the computer C under control of instructions 120 and following, and accordingly decision instruction 170 transfers control of the computer C to an exit instruction 175. The exit instruction 175 may then transfer control of the computer C to a conventional display subroutine, or to a signal processing subroutine for further signal processing, such as desweeping or cross-correlation with the input swept frequency signal from the seismic survey.

Figure 1B:
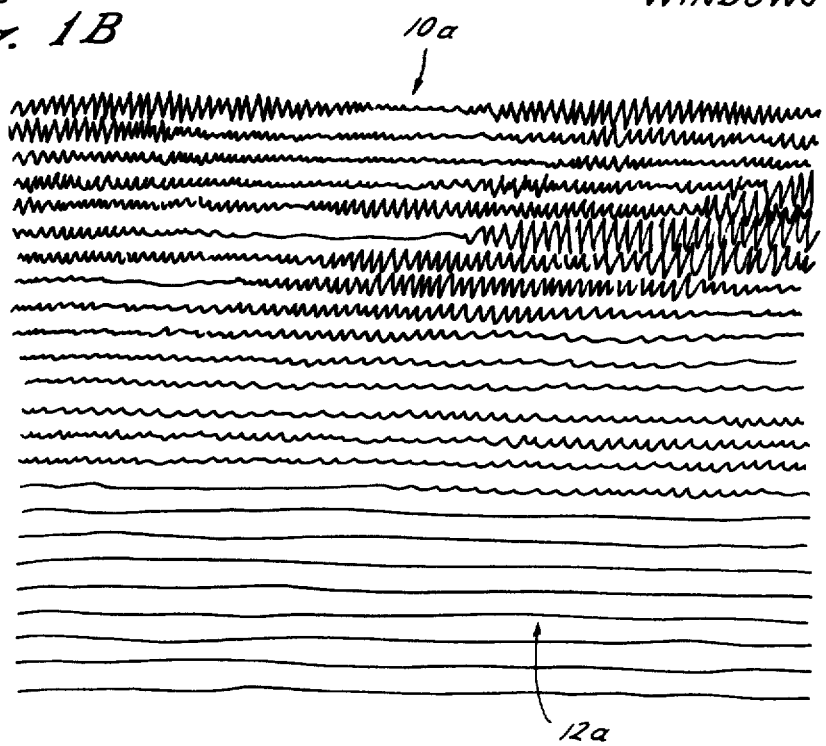
Figure 2B:
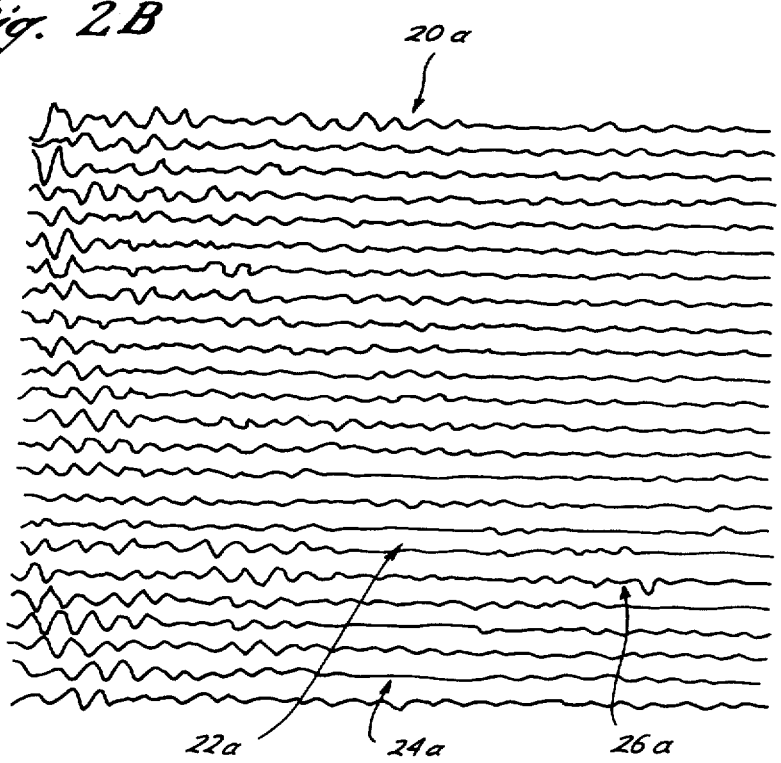

The advantage of the present invention is illustrated by comparison of the data record traces 10 and 20 (FIGS. 1A and 2A) having high amplitude noise bursts at 12 and at 22, 24 and 26, respectively, with data record traces 10a and 20a (FIGS. 1B and 2B) where the effect of these noise bursts are significantly reduced, as indicated at 12a and at 22a, 24a and 26a in the traces 10a and 22a, respectively.

By varying the input parameter NT, specifying the number of traces in the specified plurality to be processed by the computer C during one iteration, the effect of a large amplitude noise burst or spike in the seismic data can be varied. For a small number NT, the effect of the noise burst is limited to a small region in the data record traces. By comparing power levels for an increased or larger number NT, a better idea of the validity of the data in a particular seismic trace is obtained, since its power level is compared with a broader statistical base of data from the same general area.

Thus, with the present invention, the effect of noise spikes or bursts in swept frequency vibratory seismic data is significantly reduced by removing those signals whose power levels deviate abnormally from the power levels of adjacent seismic signals.

It should be understood that the foregoing embodiment is the preferred embodiment of the present invention, although numerous modifications, adjustments, changes in the program language or flow chart format, or the data output format, all coming within the scope of the appended claims, will occur to those of ordinary skill in the art.

I claim:

1. A method of processing seismic signals, from seismic surveys to reduce the effect of noise bursts on such signals, comprising the steps of:
   (a) recording a plurality of seismic signals from a seismic survey;
   (b) determining the power level of a plurality of the recorded seismic signals during a common time interval;
   (c) determining the average power of the power level so determined;
   (d) removing for the common time interval those seismic signals whose power level deviates from said average power by a predetermined amount to provide a corrected seismic signal in said time interval; and
   (e) recording said corrected seismic signal.

2. The method of claim 1, wherein said step of removing comprises:
   (a) comparing the power level of each of the plurality of recorded seismic signals during the common time interval with said average power; and
   (b) erasing for the duration of the common time interval those recorded seismic signals whose power level differs from said average power by more than a predetermined amount of deviation.

3. The method of claim 1, further including the step of:
   removing for the common time interval each seismic signal whose power level is less than a predetermined minimum power level prior to said step of determining the average power.

4. The method of claim 1 wherein M seismic signals from the seismic survey are to be processed, M being an integer, and wherein:
   said step of determining the power level comprises determining the power level of a specified plurality NT of the seismic signals, where NT is an integer less than M.

5. The method of claim 4, further including the steps of:
   (a) substituting a seismic signal from one of said M signals as yet unprocessed for one of said specified plurality NT of seismic signals to form a newly specified plurality NT of seismic signals; and
   (b) repeating said steps of determining the power level, determining the average power, and removing for the common time interval each of the seismic signals whose power level deviates from said average power of said newly specified plurality NT of seismic signals.

* * * * *